(12) United States Patent
Woo

(10) Patent No.: US 7,039,641 B2
(45) Date of Patent: May 2, 2006

(54) MODULAR PACKET CLASSIFICATION

(75) Inventor: Thomas Y. Woo, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 907 days.

(21) Appl. No.: 09/792,095

(22) Filed: Feb. 22, 2001

(65) Prior Publication Data

US 2002/0023089 A1 Feb. 21, 2002

Related U.S. Application Data

(60) Provisional application No. 60/184,581, filed on Feb. 24, 2000.

(51) Int. Cl.
*G06F 17/00* (2006.01)
(52) U.S. Cl. .................. 707/100; 370/392; 370/389; 370/401
(58) Field of Classification Search ............... 370/238, 370/389, 392, 401, 408; 707/6, 2, 5
See application file for complete search history.

(56) References Cited

U.S. PATENT DOCUMENTS

| | | | | |
|---|---|---|---|---|
| 6,011,795 A | * | 1/2000 | Varghese et al. | ............ 370/392 |
| 6,018,524 A | * | 1/2000 | Turner et al. | ............... 370/392 |
| 6,148,295 A | * | 11/2000 | Megiddo et al. | ............... 707/3 |
| 6,192,051 B1 | * | 2/2001 | Lipman et al. | ............. 370/389 |
| 6,212,184 B1 | * | 4/2001 | Venkatachary et al. | ..... 370/392 |
| 6,341,130 B1 | * | 1/2002 | Lakshman et al. | ........... 370/389 |
| 6,374,266 B1 | * | 4/2002 | Shnelvar | ..................... 707/204 |
| 6,396,842 B1 | * | 5/2002 | Rochberger | ................. 370/408 |
| 6,430,527 B1 | * | 8/2002 | Waters et al. | ................... 703/3 |
| 6,516,319 B1 | * | 2/2003 | Benayoun et al. | .......... 707/100 |
| 6,564,211 B1 | * | 5/2003 | Andreev et al. | ............... 707/3 |
| 6,614,789 B1 | * | 9/2003 | Yazdani et al. | ............. 370/392 |
| 6,678,269 B1 | * | 1/2004 | Michels et al. | ............. 370/389 |
| 6,731,643 B1 | * | 5/2004 | Cucchi et al. | .............. 370/401 |
| 6,768,991 B1 | * | 7/2004 | Hearnden | ...................... 707/5 |

* cited by examiner

*Primary Examiner*—Ajit Patel
*Assistant Examiner*—Steven Blount

(57) ABSTRACT

The novel method and system for classifying packets through the use of filters combines heuristic tree search with the use of filter buckets. This provides high performance and reasonable storage requirement, even when applied to large number of filters (from 4K to 1 million). In addition, the novel method can adapt to the input packet distribution by taking into account the relative filter usage. The capability of employing a large number of filters in a packet classifciation system is useful in providing value-added services, such as security, quality of service (QoS), load balancing, and traffic accounting.

25 Claims, 11 Drawing Sheets

```
int function SearchTree (Packet p, *Node T)
{
            if (T = NULL) return NIL;
            if (T.filters)/* leaf node */
(1.1)           return BucketSearch (p, T.filters);
            else/* internal node */
                if(p[T.bit] = 0)/* go left */
(1.2)               return SearchTree (p,T.left);
                else/* go right */
(1.3)               return SearchTree (p,T.right);
}
int function Search(Packet p, *Table T)
{
            let x_j be the first h_j bits in the j-th dimension of p;
(1)         return SearchTree (p, T[x_1⊕...⊕x_k]);
}
```

FIG. 4

```
*Table function BuildTable (FilterTable FT, int h_1,...,int h_k)
{
        maxEntries = ∏_{h_j≠0} 2^{h_j};
        T = new FilterTable (maxEntries);
        foreach Filter F_i ∈ FT{
            for j from 1 to FT.dimension{
                let p_j be the prefix in the j-th dimension of F_i;
                d_j = (h_j > numberOfBits (p_j))? h_j - numberOfBits (p_j):0;
(1.1)           s_j = first(h_j - d_j) bits of p_j ⊕ d_j bits of "0";
(1.2)           f_j = first(h_j - d_j) bits of p_j ⊕ d_j bits of "1";
            }
            foreach x_1 ∈ s_1..f_1, x_2 ∈ s_2..f_2,...,x_k ∈ s_k..f_k
(1.3)           add F_i^{1..h_j} to T[x_1⊕x_2⊕...⊕x_k].filters;
        }
        return T;
}
*Node function BuildTree (FilterTable FT)
{
        n = new Node();
(2.1)   let (T,T') be the reduct of FT;
        n.reduce = (T,T');
        FT = T;
        if(|FT| < BUCKETDEPTH){
(2.2)       n.filters = FT;
            return n;
        }
        for j from 1 to FT.dimension
(2.3)       preference[j] = ComputePreference (FT[·,j]);
(2.4)   b = least j such that for all x:preference[j] ≥ preference (x);
(2.5)   FT_0 = sub-sequence of all filters in FT whose b-th bit is "0" or "*";
(2.6)   FT_1 = sub-sequence of all filters in FT whose b-th bit is "1" or "*";
        n.bit = b;
        n.filters = NULL;
(2.7)   n.left = BuildTree (FT_0^{-b});(n.left).parent = n;
(2.8)   n.right = BuildTree (FT_1^{-b});(n.right).parent = n;
        return n;
}
*Table function BuildSearchStructure (FilterTable FT,int h_1,...,int h_k)
{
(1)     T = BuildTable (FT, h_1,...h_k);
        for x from 1 to |T|{
(2)         T[x].tree = BuildTree (T[x].filters);
            (T[x].tree).parent = T[x].tree
        }
        return T;
}
```

FIG. 6

```
function TreeInsert (Filter F,int i, *Node T)
{
(2.1)      let T.reduce be (R, R');
(2.2)      let (S, S') be the new reduct after adding F to (R, R');
           T.reduce = (S, S');
(2.3)      if (F∈ S') return;
           if (T.filters){/ *leaf node */
                T.filters = S
                if ((|T.filters| > BUCKETDEPTH){
(2.4)                if (T.side = LEFT)
(2.5)                    (T.parent).left = BuildTree (T.filters);
                     else
(2.6)                    (T.parent).right = BuildTree (T.filters);
                     T.filters = NULL;
                }
           }else(/* internal node */
                b = T.bit;
                switch F[b]{
(2.7)                0:       TreeInsert (F$^{-b}$, i, T.left);break;
(2.8)                1:       TreeInsert (F$^{-b}$, i, T.right);break;
(2.9)                default: TreeInsert (F$^{-b}$, i, T.left);
                              TreeInsert (F$^{-b}$, i, T.right);
                }
           }
}
function Insert (Filter F, int i, *Table T)
{
(1)        let A be the set of all subtrees in T such that F should be inserted;
           foreach x ∈ A
(2)            TreeInsert (F, i, x);
}
```

FIG. 7

```
function TreeDelete (Filter F, sequence of Filter U, *Node T)
{
        let T.reduce be (R, R');
        let (S, S') be the new reduct after adding all filters in U and deleting F from (R, R');
        T.reduce = (S, S');
        if (F∈ R') return;
        if (T.filters){/* leaf node */
            T.filters = S;
            if (|T.filters| = 0){
                if (T.side = LEFT)
                    (T.parent).parent = (T.parent).right;
                else
                    (T.parent).parent = (T.parent).left;
            }else if (|T.filters| > BUCKETDEPTH){
                if (T.side = LEFT)
                    (T.parent).left = BuildTree (T.filters);
                else
                    (T.parent).right = BuildTree (T.filters);
                T.filters = NULL;
            }
        }else{/* internal node */
            b = T.bit;
            U = (S - R)$^{-b}$;
            switch F[b]{
                0:      TreeDelete (F$^{-b}$, U, T.left);break;
                1:      TreeDelete (F$^{-b}$, U, T.right);break;
                default: TreeDelete (F$^{-b}$, U, T.left);
                         TreeDelete (F$^{-b}$, U, T.right);
            }
        }
}
function Delete (Filter F, *Table T)
{
        let A be the set of all subtrees in T such that F should be deleted;
        foreach x ∈A
            TreeDelete (F, 0, x);
}
```

| Type | # OF FILTERS | Use | Address Characteristics |
|---|---|---|---|
| Workstation Host | 4K | QoS (by destination IP, application) | fixed source IP to any, most traffic goes to a small number of fixed destination hosts, the rest is uniformaly distributed over a large number of random destinations, about even ingress/egress traffic |
| Server Host | 4K-32K | QoS (by source IP) | from any to fixed destination IP, highly unbalanced ingress/egress traffic ratio, about equal traffic goes to a large number of destination hosts with a fixed domain prefix (Intranet server) or random (Internet server) |
| Subnet Border Router | 4K-64K | QoS (by L2 label, subnet), security (by subnet) | from fixed subnet prefix to any, or from fixed subnet prefix to fixed subnet prefix |
| Enterprise Core Router | 4K-64K | QoS (by physical port, L2 label, application, TOS) | from fixed subnet prefix to fixed subnet prefix (Intranet), or from fixed subnet prefix to any (Internet) |
| Enterprise Edge Router | 64K-256K | QoS (by destination IP, application), security (by source IP), tunneling (by source and destination IP) | from fixed domain prefix to fixed destination prefix (VPN), or from fixed domain prefix to any (Internet), segmented by subnet |
| ISP Edge Router | 512K-1M | QoS (by source IP, application, TOS), consistency (by source IP), tunneling (by source and destination IP) | from large set of domain prefixes to another large set of domain fixes (VPN), or from large set of domain prefixes to any (Internet), segmented by customers' logical interfaces |
| ISP Core Router | 4K-64K | QoS (by application, TOS, MPLS label) | transit traffic vs traffic that originates and terminates in the ISP |
| ISP Peering Router | 4K-64K | peering agreement enforcement (by physical port, source IP), consistency (by physical port, source IP) | transit traffic vs traffic that originates and terminates in the ISP |

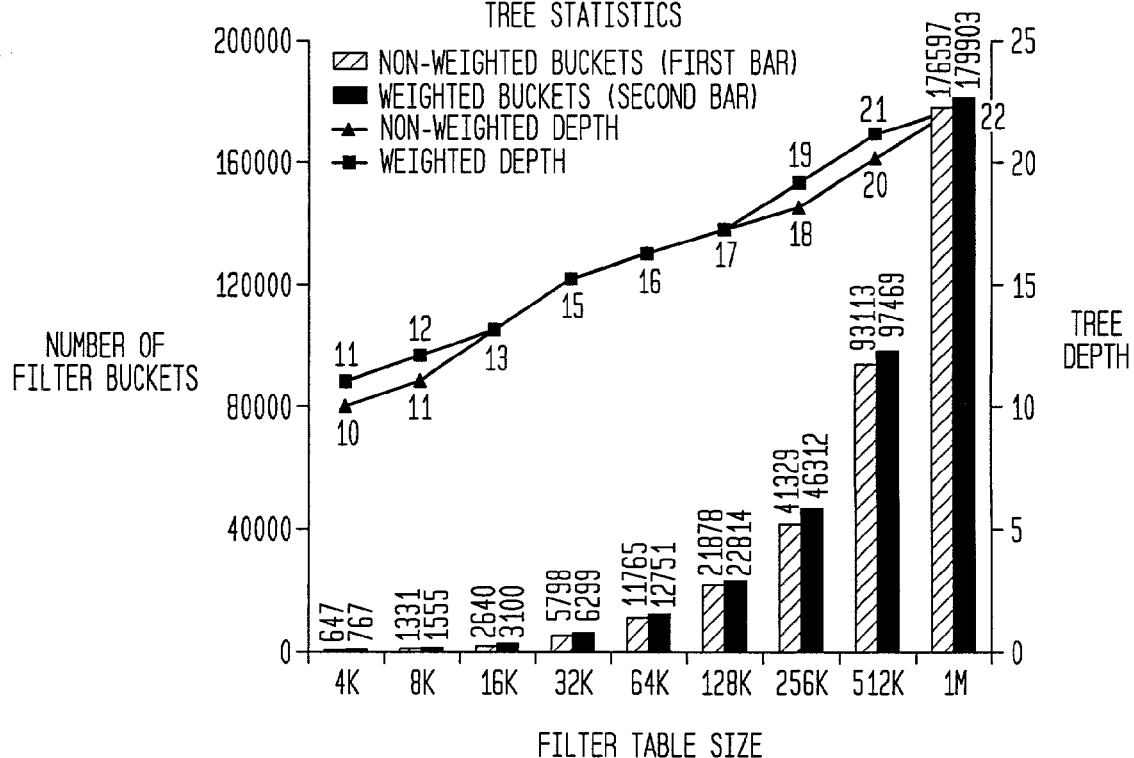
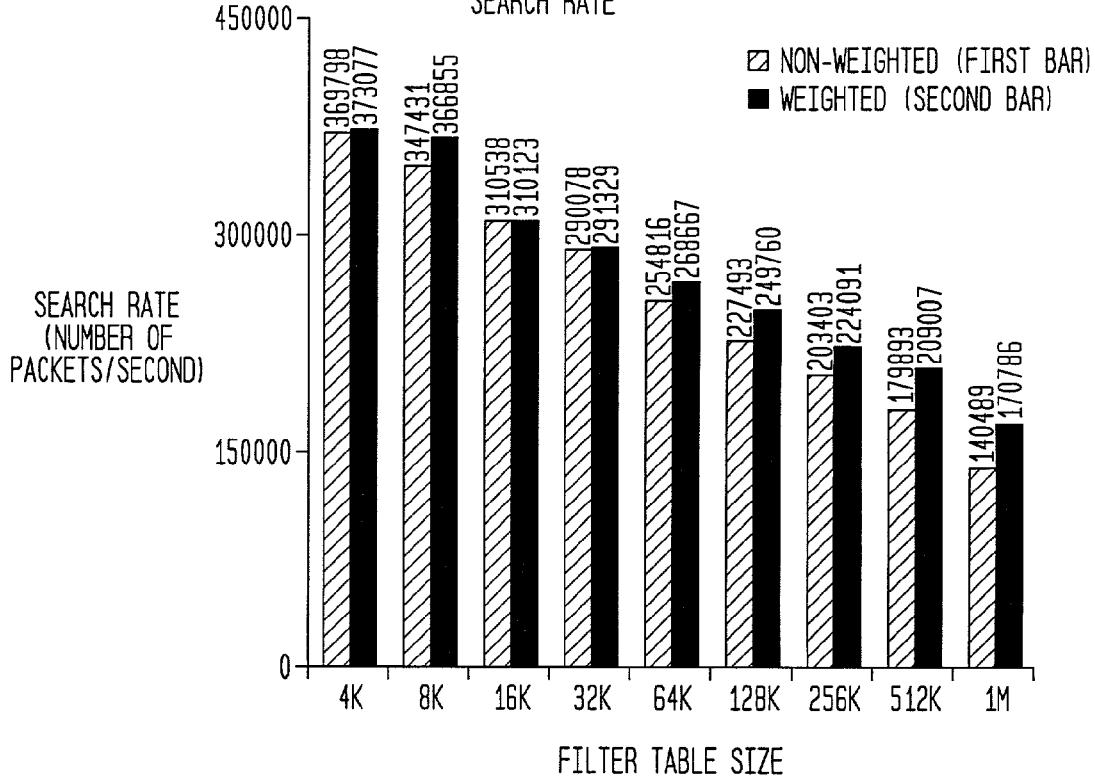

TREE STATISTICS

SEARCH RATE

TREE STATISTICS

SEARCH RATE

MODULAR PACKET CLASSIFICATION

This application claims benefit of Provisional 60/184,584 filed Feb. 24, 2000.

FIELD OF INVENTION

The invention relates to the art of packet classification, which typically occurs when packets are routed in a digital communications network.

BACKGROUND OF INVENTION

Next generation networks are expected to provide increasingly sophisticated services beyond simple connectivity such as security, quality of service (QoS), load balancing, and traffic accounting. A fundamental requirement in providing this value-added services is the ability to classify packets.

The difficulty of packet classification is determined by three factors: (1) the complexity of the filters; (2) the number of filters; and (3) the rate of packet arrivals. The first and second factors bound the amount of work required for a single packet, while the third factor gives the aggregate amount of work per unit time.

Regarding the first factor, filters for IP networks are typically based on the TCP/UDP/IP headers, and their constructions are fairly standardized. See, for instance, document no. 6 in the list of references detailed below (prior to the summary of invention). All of the listed references are incorporated by reference herein in their entirety.

Regarding the second factor, existing filter tables tend to be small (×10s to ×100s of filters) as performance degrades severely with large filter tables. However, for fine-grained policy control, the number of filters should ideally be large, ranging upward to ×100 Ks.

Regarding the third factor, the packet arrival rate is in turn determined by the input link speed and the packet size. The former is increasing at an unprecedented rate (e.g., Gigabit Ethernet in LAN, and OC-48 in WAN backbones), while the latter is decreasing to an average of 200 bytes as reported in reference document nos. 7 and 11. This combination has exacerbated the problem. For example, the worst-case packet arrival rate of an OC-12 link (assuming 64-byte packet size, 5% SONET overhead and use of Packet Over SONET protocol) is around 1 million packets per second.

The problem of packet classification can be cast as an abstract mathematical problem. For example, the problem is similar in nature to the problem of range matching in computational geometry. See reference document no. 4. There are various known algorithms that can be adapted, and theoretical results are also known. In the context of IP packets, the problems have been studied in reference document nos. 5, 9 and 10.

Most of these studies, however, focus on worst-case performance, and do not take into account actual filter usage statistics, nor the types of commonly occurring filter patterns. Moreover, they provide sparse experimental results. In particular, the asymptotic complexity does not accurately tell how the algorithms scale to large number (e.g., from 4K to 1M) of filters.

A more pragmatic approach is desired. In particular, it is desireable to be able to classify packets using a relatively large number of filters given the present state of packet arrival rates. Towards this end the invention seeks to provide a relatively efficient method and system for finding or identifying an applicable filter when a relatively large number of filters are employed in a packet clasification system.

REFERENCE LIST

[1] T. C. Bell, J. G. Clearly, and I. H. Witten. *Text Compression*. Prentice Hall, 1990.

[2] R. Callon, P. Doolan, N. Feldman, A. Fredette, G. Swallow, and A. Viswanathan. *A Framework for Multi-protocol Label Switching*. Available at http://www.ietf.org/internet-drafts/draft-ietf-mpls-framework-02.txt.

[3] ArrowPoint Communications. *Content Smart Switching*. Available at http://www.arrowpoint.com/products/css/css_ov-about.html.

[4] M. de Berg, m. van kreveld, M. Overmars, and O. Schwarzkopf *Computational Geometry: Algorithms and Applications*. Springer Verlag, 1997.

[5] D. Decasper, Z. Dittia, G. Parulkar, and B. Plattner. Router plugins: A software architecture for next generation routers. In *Proceedings of ACM Sigcomm*, pages 191–202, Vancouver, Canada, Aug. 31–Sep. 4, 1998.

[6] Cisco documentation. *Access List Summary*. Available at http://www.cisco.com/univercd/cc/td/doc/product/software/ssr90/rpc_r/21972.htm.

[7] National Laboratory for Applied Network Research. *WAN packet Size Distribution*. Available at http://www.nlanr.net/NA/Learn/packetsizes.html.

[8] V. Fuller, T. Li, J. Yu, and K. Varadhan. *Classless inter-domain routing (CIDR): an Address Assignment and Aggregation Strategy*, June 1993.

[9] V. Srinivasan, G. Varghese, S. Suri, and M. Waldvogel. Fast and scalable layer four switching. In *proceedings of ACM Sigcomm*, pages 191–202, Vancouver, Canada, Aug., 31–Sep. 4, 1998.

[10] D. Stiliadis and T. V. Lakshman. High-speed policy-based packet forwarding using efficient multi-dimensional range matching. In *Proceedings of A CM Sigcomm*, pages 203–214, Vancouver, Canada, Aug. 31–Sep. 4, 1998.

[11] K. Thomson, G. J. Miller, and R. Wilder. Wide-area traffic patterns and characteristics. *IEEE Network Magazine*, 1997.

[12] H.-Y. Tzeng. Longest prefix search using compressed trees. In *Proceedings of IEEE Globecom*, Sydney, Australia, Nov. 8–12, 1998.

SUMMARY OF INVENTION

The invention employs a "divide and conquer" approach. Generally speaking, the invention breaks up the classification procedure into two main steps. In the first step, an attempt is made to eliminate as many filters as possible by examining specific bit positions. However, instead of eliminating all but one filter, the first step terminates when the set of remaining filters is less than some pre-specified maximum. This set of filters, having a maximum size, is termed a "filter bucket". This early termination avoids the explosion that is often the result of trying to completely differentiate between a few "similar" filters. In the second step, the filter bucket is processed to find a match. Because of the limited size of a filter bucket, a completely different procedure (e.g., (hardware-based) linear or associative search) can be used. Thus the invention involves a modular composition of two procedures: the first to decompose a large filter table into small filter buckets of a fixed maximum size (e.g., from 4 to 64), and the second to process limited-size filter buckets to find a match.

In one embodiment of the invention the relative usage of the individual filters in a filter table can also be taken into account to build a more optimal search data structure. This can be important as usage of individual filters tends to be highly unbalanced.

According to one aspect of the invention, a data structure is provided for organizing a plurality of k-dimensional filters used to classify k-dimensional bit strings, k>0. The data structure includes a jump table indexed on pre-selected prefixes of pre-selected filter dimensions. The jump table points to a plurality of search trees. Each of the search trees has one or more terminating leaf nodes which identify a relatively small set of filters.

The trees are preferably constructed such that each node is associated with pre-selected bit positions of pre-selected filter dimensions. More particularly, the search trees are preferably $2^m$-ary trees, m>0, and constructed such that each level is associated with m consecutive bits at pre-selected bit positions of pre-selected filter dimensions. In one embodiment disclosed herein m=1 and the search trees are constructed such that successive deeper nodes are associated with successive bit positions of pre-selected filter dimensions. The pre-selected filter dimensions are those which preferably minimize the depth of the tree and/or maximize the balancedness of the tree as explained in greater detail below.

According to another aspect of the invention a method is provided for identifying a filter used to classify a packet having at least one corresponding field of interest. The method comprises: (a) searching a jump table for an entry matching the bits at pre-selected bit positions of the at least one packet field, wherein the jump table points to a plurality of search trees, the search thereby identifying one of the search trees; (b) traversing the identified search tree until a terminating leaf node is reached, the terminating leaf node identifying at least one filter bucket; and (c) searching the identified filter bucket until a match is found between the bits of the at least one packet field and the bits of the filter.

According to another aspect of the invention a method is provided for identifying a k-dimensional filter used to classify a packet associated with k filter fields, k>0. The method includes: (a) searching a jump table for an entry matching the bits at pre-selected bit positions of one or more pre-selected filter fields, wherein the jump table is indexed on pre-selected bit positions of pre-selected filter dimensions and points to a plurality of search trees, thereby identifying one of the search trees; (b) traversing the identified search tree by comparing the bits at pre-selected bit positions of one or more pre-selected filter fields against the bits at pre-selected bit positions of pre-selected dimensions of the filters associated with each level of the tree until a terminating leaf node is reached, the terminating leaf nodes identifying at least one relatively small set of filters; and (c) searching the identified relatively small set of filters until a match is found between the bits of the k filter fields and the bits of the k filter dimensions, if any.

According to another aspect of the invention a method is provided for converting a k-dimensional filter table. The method includes segmenting the filters into broad subsets based on pre-selected prefix lengths of pre-selected filter dimensions; and recursively dividing each such broad subset into one or more filter buckets. The division is preferably carried out by recursively dividing each set of filters into two subsets, one such subset having a 0 or don't care bit at a pre-selected bit position of a pre-selected filter dimension and the other such subset having a 0 or don't care bit at the pre-selected bit position of the pre-selected filter dimension.

BRIEF DESCRIPTION OF DRAWINGS

The foregoing and other aspects of the invention will become more apparent from the following description of illustrative embodiments thereof and the accompanying drawings, which illustrate, by way of example, the principles of the invention. In the drawings:

FIG. 4 shows psuedocode employed by the first embodiment for creating a data structure such as that shown in FIG. 1;

FIG. 6 shows psuedocode employed by the first embodiment for incrementally inserting a filter into a data structure such as that shown in FIG. 1;

FIG. 7 shows psuedocode employed by the first embodiment for incrementally deleting a filter from a data structure such as that shown in FIG. 1;

FIG. 10 is a table describing filter characteristics in terms of the location of device within a typical network;

FIG. 11(a) is a graph illustrating search tree depth and number of filter buckets as a function of the size of a filter table in various instantiations of the first embodiment;

FIG. 11(b) is a graph illustrating the search rate as a function of the size of a filter table in various instantiations of the first embodiment;

DETAILED DESCRIPTION OF ILLUSTRATIVE EMBODIMENTS

Figure 1:
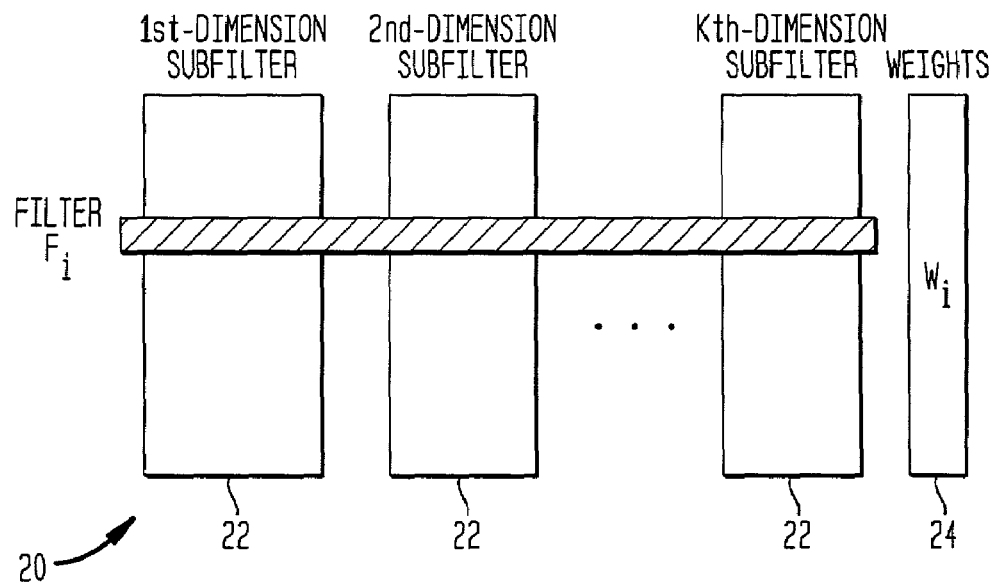
FIG. 1 illustrates a multi-dimensional IP packet filter table.

The detailed description is organized as follows. In Section 1, the packet classification problem is defined. In Section 2, the details of my algorithms are presented in accordance with a generic embodiment of the invention. In Section 3, implementation issues are examined. In Section 4, the framework for modeling filter tables is highlighted. In Section 5, experimental results are presented. In Section 6, our approach is compared to related work.

1. The Packet Classification Problem

From an algorithmic perspective, the IP packet classification problem is simply a concrete instance of the abstract classification problem. In the following, the latter is defined first and then it is specialized to IP in the next subsection.

1.1 Abstract Classification Problem

A basic filter f is an ordered pair (b, m) of binary strings of equal length. We call b the pattern, and m the mask. m indicates the significant bits in b for matching purpose. For example, the basic filter (1001, 1010) means that the first and third (counting from left to right) bits of "1001" are significant for matching purpose. Equivalently, a basic filter can be represented as a ternary string in the alphabet {0,1,*}. Specifically, all the insignificant bits are b are replaced by "*," the don't care bit. The example above can be denoted as "1*0*."

Three special cases of basic filters can be defined. A basic filter, or equivalently called a mask-based filter, f=(b, m) is called (i) "exact" if m consists of all "1"s; (ii) "wildcard" f m consists of all "0"s; and (iii) "prefix" if m is made up of "1"s followed by "0"s. Clearly, both exact and wildcard basic filters are special cases of prefix basic filters; and any basic filter can be represented as a collection of prefix basic filters. For example, the basic filter "*0" is equivalent to the collection of prefix basic filters {"00", "10**"} since in both cases m=1100.

A binary string t matches a basic filter f=(b, m) if t and b are of equal length and are identical in all significant bit positions as indicated by m. For example, "1100" matches the basic filter "1*0*."

A basic filter is equivalent to a 1-dimensional filter. A k-dimensional filter F is a k-tuple of basic filters. A k-dimensional filter table of size N is an ordered sequence of N k-dimensional filters. We typically denote such a table FT by the sequence $F_1, F_2, \ldots, F_N$. The size of a filter table FT is denoted by |FT|, i.e., $|F_1, F_2, \ldots, F_N|=N$.

Let t be a k-tuple $(t_1, \ldots, t_k)$ of binary strings, and F a k-dimensional filter denoted by $(f_1, \ldots, f_k)$. Binary string t is said to match F if for all $1 \leq j \leq k$, $t_j$ matches $f_j$. In this case, F is called a matching filter for t.

Given a k-dimensional filter table FT of size N denoted by $F_1, \ldots, F_N$, a procedure for abstract classification takes an arbitrary input k-tuple t and returns the first $F_i$ such that t matches $F_i$, or NIL if there is no match. We call $F_i$ the best matching filter for t. A good classification procedure is one that can perform classification in a small number of steps with minimal amount of storage. Other solution requirements (e.g., update) are elaborated in section 1.3 below.

An equivalent formulation of the problem is to associate each filter with a distinct cost or priority. In this case, the classification procedure should return the matching filter with the least cost or highest priority.

A simple extension to the classification problem is to associate each filter $F_i$ with a weight $W_i$. The weight represents the relative match frequency of a particular filter, and is typically derived from the distribution of the input tuple t or filter usage statistics. More $$\frac{prob(F_i \text{ is the best matching filter for } t)}{prob(F_{ji} \text{ is the best matching filter for } t)} \approx \frac{W_i}{W_j}$$

precisely, let t be drawn from some fixed input distribution from the $W_i$'s are derived. Then Knowledge of the weights may help in constructing more efficient classification procedures. We call this extended problem the weighted abstract classification problem. In the what follows, to avoid repeated definitions, the classification problem without weights is treated as the weighted classification problem where all $W_i$'s are 1.

1.2 Filter Covering

Given a filter table FT, not all filters can potentially be matched. For example, consider the 1-dimensional filter table 1*, 00, 11, 01,0*, both the filters "11" and "0*" will never be returned as a match as any input matching them would have matched earlier filters, "1*" for the former and "00" or "01" for the latter.

We can formalize this with a notion called "covering". A set of filters $S=\{F_i\}$ is said to cover a filter F if for all input t, if t matches F, then t also matches some filter $F_i$ in S. Given a filter table FT, a subsequence of filters $F_{i1}, \ldots, F_{im}$ is said to cover $F_1$ if $\{F_{i1}, \ldots, F_{im}\}$ covers $F_1$ and $i_m \leq 1$.

Using the covering relation, we can divide a filter table FT into two sub-tables T and T' such that (1) filters and T and T' are subsequences of FT; (2) T and T' form a partition of FT, i.e., all filters in FT are in exactly one of T or T'; (3) $\forall F \in T'$, $\exists F_{i_1}, \ldots, F_{i_m} \in T$ such that $F_{i_1}, \ldots, F_{i_m}$ cover F; (4) T' is a maximal subsequence satisfying (1)–(3). It can be shown that such a division produces a unique pair T and T'. We call the process of obtaining T and T' "reduction", and denote (T, T') as the "reduct" of FT.

A filter table FT is said to be reduced if the reduct of FT is (FT, 0). The procedure to reduce a filter table is straightforward, and is a variation of the problem of detecting overlapping line segments. See more particularly reference document no. 4.

1.3 IP Packet Classification

The IP packet classification problem can be stated as a specific instance of the abstract classification problem applied to the domain of classifying IP packets. The specific instantiation is defined as follows:

The different dimensions of a filter correspond to the different fields of interest that can be extracted from an IP packet or its processing path. Typical dimensions include: physical ingress port number (the physical port from which the packet is received), layer 2 label (DLCIs in Frame Relay header, MPLS labels, etc.), physical egress port number (the physical port to which the packet is to be sent), source and destination IP addresses, protocol number, differentiated service (DS)/type of service (TOS) byte, source and destination TCP/UDP port numbers.

An IP packet filter table can potentially include any number of the above dimensions. Two forms are more popular: (1) 2-dimensional table with source and destination IP addresses; and (2) 5-dimensional table with source and destination IP addresses, protocol number, source and destination TCP/UDP port numbers.

For IP packet filtering, a general form of filter called a "range" filter, were each dimension is specified as a range (s, f) (s≦f are integers), is sometimes used. For example, one can specify a range of port numbers to match using the range filter 6031, 8011). A range filter is more general than a prefix filter. It is, however, not directly comparable to mask-based filter. Specifically, some range filters, e.g., (9, 11), cannot be expressed as a single equivalent mask-based filters, and some mask-based filters, e.g., "*01*", can not be expressed as a single equivalent range filter. Our algorithm presented below can potentially handle both mask-based and range filters because of its modular nature. Specifically, the tree search phase operates on mask-based filters, while the filter bucket search phase can process any type of filters.

In practice, the address dimensions are almost always prefix-based, while the other dimensions are generally exact filters and occasionally range-based. In worst case, the relatively infrequent range filter can be expanded into its equivalent set of prefix basic filters or dealt with separately (see Section 6 below).

IP packet filter tables are not an arbitrary collection of filters. For large filter table (with entries up to 1 million), the filters are typically created automatically according to some policy meta-rules. As a result, the filter table follows a certain structure. For example, exact filters that apply on a per-host or per-flow basis tend to be higher up in the table than policy filters which apply to a collection of hosts or flows. In other words, filters with more "don't cares" tend to be placed after more specific filters.

In addition, update of policy filters tend to be less frequent than exact filters. For example, in a firewall application, per-flow filters are typcially exact and transient. That is, they get inserted when a new flow is detected and deleted when the flow expires. The modeling of IP packet filter table can be important to evaluating the actual performance of a particular proposed algorithm. This is discussed in Section 4 below.

The correctness of the algorithms presented below does not depend on the nature of the IP packet filter table. The "shape" (i.e., distribution of "0"s, "1"s, and "*"s in each column) of the filter table does impact its performance, especially in terms of storage requirements. This is further discussed in Section 3 below.

A pictorial representation of an IP packet filter table 20 is shown in FIG. 1. The table 20 includes a plurality of k single-dimension sub-filters 22 such that a given filter $F_i$ can be viewed as a series or concatentation of k basic filters. In addition, each filter $F_i$ can also include a weight $W_i$ which collectively form another column 24 of the table 20.

The weighted IP packet classification is similarly derived from the corresponding weighted abstracted classification problem. In this case, the weights are derived from the usage counters associated with each filter; and for performance evaluation purpose, the incoming packets are assumed to be distributed in a way consistent with the weights.

The ability to adapt search to incoming traffic can be important for IP packet classification as filter usage tends to be highly unbalanced. This distinguishes the present approach from most existing approaches that can not easily take into account the relative usage of individual filters.

1.4 Solution Requirements

In comparing solution approaches, the present first fixes the complexity of filters and the number of filter rules. The embodiments presented below focus mostly on 2 and 5-dimensional prefix-based filters and filter table size of up to 1 million entries. Different solution approaches can then be differentiated along the following criteria:

(a) Speed of Classification. The speed of classification is determined by the number of search steps and the operation performed at each search step. There are at least 3 measures for the speed of classification: (i) the "worst case" search time possible for a packet; (ii) the "average case" search time possible for completely random collection of packets; and (iii) "statistical", being the average case search time for packets drawn from some a priori specified packet or filter usage distribution. In the embodiments presented below statistical search speed was measured by first assigning weights to filters (which came from the filter usage statistics, or counters associated with each filter), then random packet traffic was generated consistent with the weight distribution, and the average search speed was measured.

(b) Amount of Storage. The amount of memory space occupied by the search data structure is an important consideration. There is a clear tradeoff between search time and search space. Large memory space not only means extra cost for memory, but it may also force the use of slower memory (e.g., DRAM) in place of faster memory (e.g., SRAM).

(c) Ease of Update. There are at least three possible updates. A "full" update refers to the initial construction of the search data structure from the filter table, or any re-construction thereafter from scratch. An "incremental" update refers to the incremental addition or deletion of filters from a search data structure. Finally, "reorganization/rebalancing" can be required since, as filters are added and/or deleted over time, the search data structure may lose its efficiency. Certain packet classification approaches may include a procedure to reorganize the search data structure so as to regain its operating efficiency.

The importance of incremental update is highly application specific. Policy filters tends to change slowly, while the flow-based filters can come and go at a high frequency. Reorganization is optional, as a full update can always be called when reorganization is needed. Reorganization is most useful if it takes significantly less time than full update.

Generally, the time for incremental update is an order of magnitude less than that for reorganization, which in turn should be an order of magnitude less than that for full update for it to be useful.

2. Algorithms

The present approach comprises 4 algorithms: initial construction, (or equivalently, full update), incremental insert, incremental delete, and search. The first 3 are construction and maintenance of the search data structure, and the last one for performing the actual classification.

To motivate the present approach, a few key observations are first made:

1. For efficient search, a search path should seek to eliminate as many filters as possible from further consideration in the smallest number of steps. This, however, requires global optimization and can be extremely computationally intensive, due to the amount of look ahead. As an alternative, carefully designed local optimization techniques can be used to obtain reasonable search paths.

2. Prolonged search time and/or storage explosion are often the result of trying to separate "similar" filters. For example, separating the filters "0110" and "* * *" requires examining all 4 bits. Therefore, to avoid explosion, "similar" filters may be separated using a different technique.

3. The suitability of a search algorithm is highly dependent on the total number of filters. For large numbers of filters (e.g., 4K–1M), a decompositional technique with a multiplicative decrease factor can potentially yield an exponentially smaller set of filters in a linear number of filters in a linear number of steps. For small number of filters (e.g., <64), simplistic search procedures (e.g., a (pipelined) linear search) can perform as well as more sophisticated schemes. This suggest that as search progresses, i.e., as the number of remaining filters decreases, a change of the search approach may be desirable.

4. Filter usage statistics can provide useful hint on constructing efficient search data structures. Filter implementations typically keep a usage counter for each filter for statistics-collection purposes. An approach that can make use of such statistics is desirable. We call such approaches "adaptive", as they can adapt to input traffic characteristics.

5. There is a clear search speed vs. storage tradeoff in most packet classification approaches. A good approach should allow flexible and tunable control between search speed and storage. Specifically, a user should have an explicit means to decrease the storage requirement if she is willing to accept a higher average search time, or vice versa.

Figure 2:
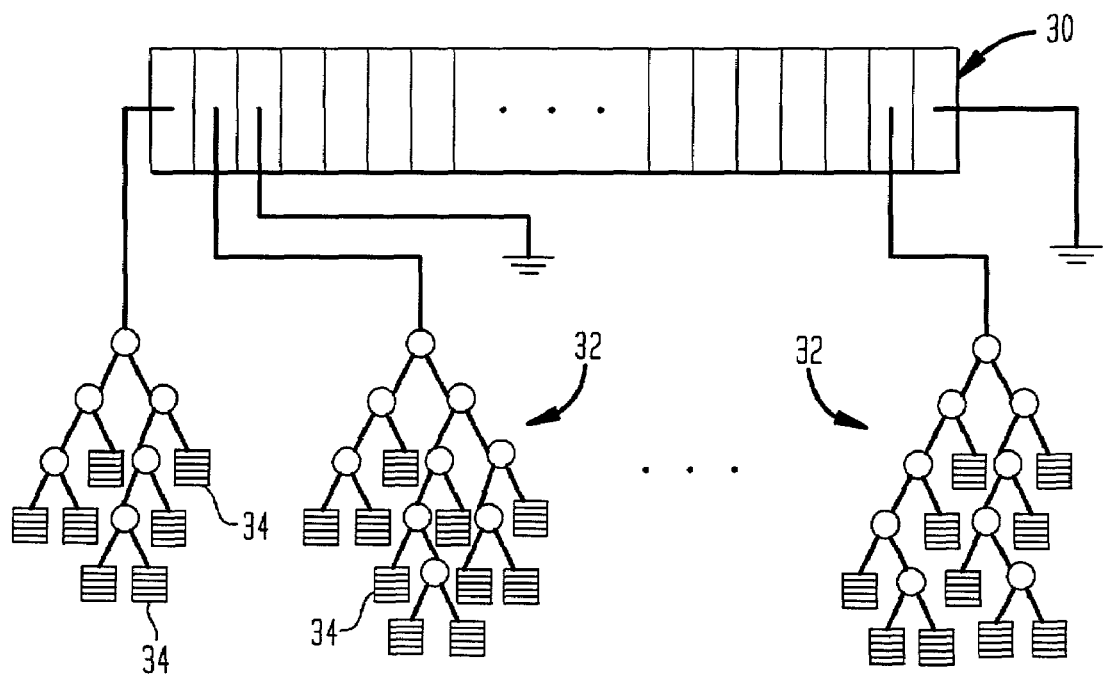
FIG. 2 illustrates a data structure according to a generic embodiment of the invention for rapidly searching for and identifying an applicable packet filter.

The present approach addresses each of the above observations. At a very high-level, the present approach organizes the search space into three layers, as shown in FIG. 2:

Index jump table 30—The filters are statistically divided into different groups using some initial prefixes of selected dimensions.

Search tree 32—The filters in each group are then organized in a $2^m$-ary search tree 32. The search tree is constructed by examining m bits of the filters at a time, and dividing them into $2^m$ groups. The particular m bits chosen for examination in each step can be drawn from any m arbitrary unexamined bit positions from any of the dimensions, and the choice is made to minimize duplication and maximize "balancedness" of the $2^m$ children. Many different criteria can be defined for the division. An embodiment presented below takes into account the filter usage statistics, thus allowing it to adapt to the distribution of input traffic.

The division process terminates when the number of filters in a node is less than some pre-defined maximum.

Filter bucket 34—The set of filters left at the leaf nodes when the division process terminates is called a "filter bucket". Essentially, a filter bucket contains a set of filters that we do not wish to further distinguish using the tree. Typically a different algorithm is applied to search the filter bucket for a match. In other words, the filter bucket demarcates the point where the search approach switches from one to another.

A filter bucket contains at most a pre-defined maximum number (typically small from 4 to 64) of filters.

Given the search data structure, in the search procedure a packet is first directed to a specific subtree by indexing (or hashing) via the jump table 30 using the initial prefixes of certain selected dimensions. Then, the search procedure goes through a "sifting" process so as to traverse the tree further and further downward by inspecting m bits of the packet at each step, until a filter bucket is reached. A bucket search procedure is then invoked to match the incoming packet against the filters in the bucket.

The present approach is modular in that it combines in a modular way (1) two data structures, one for storing the search tree and the other for filter bucket, and (2) two search algorithms, one for traversing the search tree and the other for matching against the filter bucket.

The tree phase is preferably optimized to allow the search to quickly narrow down to a single filter bucket among a large set of filters (up to 1 million filters in our experiments). The bucket phase is also preferably optimized to quickly search through a small set of filter (up to 64 filters in our experiments) in a filter bucket to find a match.

Since the m bits consumed in each step are not necessarily taken from a left to right order, unlike some existing approaches, our search procedure does not easily admit a spatial decomposition interpretation. Instead, our approach represents a class of algorithms, rather that a specific algorithm. Specifically, by varying the criteria for selecting the m bits, m itself, and the amount of look ahead in determining the best m bits to use, one can obtain different instantiations of the algorithm. The embodiment described in Section 2.3 below, m=1, a single step lookahead is employed, and the bit selection criteria is based on filter statistics. However, the extension to the general case will be straightforward to those of skill in this art as the key ideas remain the same.

In the following, for ease of explanation, the procedures shown are not optimized. An actual implementation tries to reuse as much computation as possible at each step, as discussed in greater detail in Section 3.

2.1 Notations

Before discussing the algorithms in greater detail, some definitions are in order. Let B be a 2-dimensional (n rows by m columns) array of ternary digits 0, 1, and *. That is each B[i, j] is either 0, 1, or *. Denote the i-th row by B[i ·], and the j-th column by B[·, j]. In addition, denote by $B^{-x\cdot y}$ the resulting n by m−(y−x+1) array obtained by removing columns x through y from B. Abbreviate $B^{-x\cdot x}$ by $B^{-x}$. Lastly, each row i of B has an associated weight denoted by $W_i$.

For each column j ($1 \leq j \leq m$), the present approach defines 3 quantities $N0_j(B)$, $N1_j(B)$ and $N^*_j(B)$ as follows:

$$Nx_j(B) = \sum_{1 \leq i \leq n, B(i,j)=x} W_i$$

where x could be 0, 1, or *. In words, $Nx_j(B)$ is the total weights of all the rows whose j-th column is x. Furthermore, define $$D_j(B) = |N0_j(B) - N1_j(B)|$$

which gives the difference between the total weights of the rows whose j-th column is 0 and those whose j-th column is 1.

Figures 3, 5:
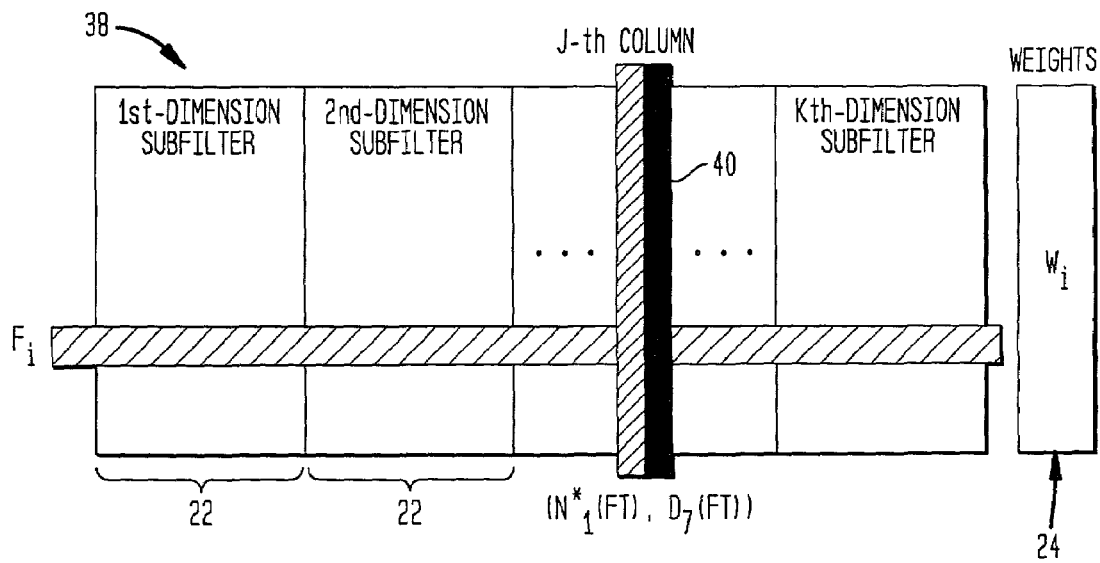
FIG. 3 illustrates a concatenated multi-dimensional IP packet filter table used according to a first embodiment of the invention to create a data structure such as that shown in FIG. 1.
FIG. 5 shows psuedocode employed by the first embodiment for searching a data structure such as that shown in FIG. 1 in order to find an applicable filter and classify packets.

Let $FT = F_1, \ldots, F_N$ be a k-dimensional IP packet filter table. By concatenating all the dimensions together, it can be viewed as a 2-dimensional array 38 of ternary digits, as shown in FIG. 3. In particular, each $F_i$ is fixed-length ternary digit string. Using the above definitions, associate for each column j (ref. no. 40) of this array an ordered pair $(N^*_j(FT), D_j(FT))$.

2.2 Filter Bucket

The basic building block in the present approach is a filter bucket. A filter bucket has the following properties: (1) It contains a small pre-defined maximum numbers of filters; typical bucket sizes are 4, 8, 16, 32, and 64. (2) The filters in a bucket are "similar" in some way. Specifically, there is a set of bit positions such that all filters in the bucket are "similar." (Note that "*" is considered to be similar to both "0" and "1," while "0" and "0" are not "similar.") (3) A filter may appear in multiple filter buckets. For example, a range filter typically appears in multiple filter buckets.

Because of the small number of filters, many techniques can be used to efficiently search a filter bucket. A few are described here:

Linear Search—Though linear search may appear slow in software, it is a decent choice for hardware implementation. By searching of the filters in a pipelined fashion, the throughput of a M-filter linear search equals that of a 1-filter search. The matching of each dimension in a filter can proceed in parallel by using multiple comparators. In other words, an M-stage pipeline implementation can search a filter bucket of depth M in the time of a single comparison. Linear search table also allows easy updates.

Binary Search—We can represent each dimension of a filter by an interval. A packet can be matched by first applying a binary search on all the end points in each dimension, and then combining the results from all dimensions. See more particulary reference document no. 10.

Hardware CAM—By using a content addressable memory (CAM) to store each dimension (prepended with the bucket ID) of a filter in a filter bucket, each dimension can be searched in parallel and then combined in a parallel step to obtain a match.

In what follows, and in particular in relation to the discussion of the experimental results, the use of the linear search as the procedure for filter buckets is assumed.

2.3 Initial Construction

FIG. 4 presents psuedocode 50 for the initial construction of the data structures shown in FIG. 2. The construction comprises two key steps: steps (1) and (2) of function BuildSearchStructure( ) in FIG. 4. Step (1), which calls function BuildTable( ), constructs the index jump table 30. Step (2), which calls function BuildTree( ), builds the search trees 32.

The BuildTable( ) function uses the following inputs:
a k-dimensional IP packet filter table FT; and
for each dimension $1 \leq j \leq k$, the number of bits $h_j$ to be used in the construction of index jump table 30 (see FIG. 2).

In step (1), the set of filters is broadly divided into a collection of smaller sets of filters by examining the first $h_j$ bits of dimension j (steps (1.1)–(1.2)). A filter is duplicated into multiple such filters set if the prefix length of at least one of its dimension j is less than $h_j$ (step (1.3), ⊕ denotes the binary string concatenation operator).

The $h_j$'s are preferably chosen such that it is at most the minimal prefix length of the j-th dimension among all the filters. The motivation is that the set of filters sharing the same prefixes in multiple dimensions is hopefully smaller. Both indexing or hashing can be used to map prefixes into search trees.

In step (2), individual subtrees are constructed for each of the smaller filter sets created in step (1) by Buildtable( ). Each filter set is divided recursively (steps (2.7)–(2.8)) until it can fit into a filter bucket (step (2.2)). Each tree node in a subtree logically corresponds to a set of filters that is still under consideration. Each child of a tree node contains a subset of the filters in the parent's node, and each leaf node contains a filter bucket.

The basic idea of the division is as follows: Given a particular bit position b, a set of filters can be divided into 2 groups: the "0"-group containing all the filters whose b-th bit is "0" or "*," (step 2.6)). The rationale is that if the b-th bit of an input packet is "0," then it can only match the filters in the "0"-group and thus only those need to be considered further, and vice versa for the "1"-group. Thus, the key is to choose "good" bit positions so that only a small number of division is needed to reach a leaf node. A single bit branching/selection scheme is described in the next subsection. Those skilled in this art will appreciate, however, that the bit selection criteria described below extends in a straightforward manner to the multibit case. Multibit branching can potentially reduce storage requirement and search time, at the expense of increased construction time.

The reduction in step (2.1) can be important. Though a correct tree will result even with no reduction, by "collapsing" filters in intermediate nodes, the number of nodes generated can be significantly reduced.

2.4 Bit Selection

The bit selected at each node determines the overall "shape" of the tree. Thus, given some global measure of the "goodness" of a search tree, the bit selected at each node should ideally "grow" the tree toward some final optimal shape. In abstract terms, we assign a preference value for each unprocessed bit position (step (2.3)), and we pick the bit with the highest preference position (step (2.4)).

For a search tree, a typical "goodness" measure is the weighted average search path length which is defined in our case as $$wa(T) = \frac{\sum_i \left( \text{depth of filter bucket } i \cdot \sum_{F_j \in \text{filter bucket } i} W_j \right)}{\text{total number of filter buckets}}$$

This measure, though concrete and optimal, is computationally expensive to calculate, as it involves comparing fully constructed trees.

As a compromise, the present approach tries to optimize local measures in a hope that they cumulatively produce a reasonably "good" global solution. The "localness" of a measure is defined by the amount of lookaheads it uses. In what follows, results are presented only for the case where a single bit is chosen at each node and the preference value is based only on one level of lookahead.

The preference metric that may be used employs a combination of two values: $N^*_j$ and $D_j$. The former provides a measure of progress. Specifically, branching based on bit j will not eliminate more filters from consideration for the amount of traffic proportion to $N^*_j$. Thus to maximize progress, the value $N^*_j$ should be minimized. The latter provides a measure of balancedness. Specifically, a smaller value of $D_j$ means more even branching of traffic into the next level.

In on embodiment, the preference value of column j for a lither table FT can be expressed as:

$$\text{preference}[j] = \frac{D_j(FT) - D_{\min}(FT)}{D_{\max}(FT) - D_{\min}(FT)} + \frac{N^*_j(FT) - N^*_{\min}(FT)}{N^*_{\max}(FT) - N^*_{\min}(FT)}$$

This construction approach is a "greedy" one in that it tries to optimize only locally. The final tree it constructs can be "skewed" by the distribution of the bits in the filter set, and may be far from optimal. However, as discussed in Section 5, the results for even very large number of realistic filters (up to 1 million) are comparatively good. In addition, unlike most existing proposals, this construction can adapt to the actual usage of the filters.

2.5 Search

FIG. 5 shows the pseudocode 54 for the search procedure. The code, which should be self-explanatory, first concatenates the leading $h_j$ bits from each dimension j of the incoming packet to construct an index into the jump table 30 to retrieve the root of a search tree 32. Then, it traverses the search tree 32 by branching according to the value of the bit position stored in the current node, until it reaches a leaf node. Finally, the filter bucket 34 is searched to locate a possible match.

Each phase of the search procedure, namely, index jump, bit branching, and bucket search, is simple and amenable to highly efficient implementation in software or hardware.

2.6 Incremental Update

Both insert and delete are performed using "diffusing update" techniques. That is, the filter to be inserted or deleted is pushed down the search tree as far as it can until it is either "absorbed" by a tree node or reaches a leaf node. An update may be duplicated at an intermediate node to follow both branches.

2.6.1 Insert

FIG. 6 shows pseudocode 56 for the incremental insert procedure. In step (1), the sets of subtrees in which the new filter should be inserted is determined. The details are the same as the steps (1.1)–(1.3) of BuildTable ( ) in FIG. 4. Again, there is typically only one such subtree.

For each such subtree, TreeInsert ( ) (step 2)) tries to push the new filter down the tree as far as it can in a recursive manner. At each node, the reduct as stored in T.reduce is recomputed by taking into consideration the new filter F (steps (2.1)–(2.2)). (Each recursion removes a bit from the original filter to be inserted (steps (2.7)–(2.9)). Thus strictly speaking, the input argument to each subsequent TreeInsert ( ) call after the root is not the original filter F.) If F is covered by some existing filters, it is not further propagated (step (2.3)).

If the current node is a leaf node, and the addition of the new filter causes the bucket to exceed BUCKETDEPTH, a split of the current bucket is needed (steps (2.4)–(2.6)).

In a nutshell, the tree traversal is to propagate the "parts" of the new filter that is not covered by any existing filters, and insert them at the appropriate leaf nodes. Separately, the set of existing filters that become covered are "removed."

Those skilled in this art will see that the complexity of inserting a new filter is bounded by the depth of the tree and the number of don't care bits in the new filter. This fits well with the observation that the majority of inserts are for exact filters, while filters with more don't care bits get changed less often.

Note that the insertion of a new filter does not result in the same tree that would have been generated had the new filter been part of the original filter table. The new filter follows the "path" that has been laid out during the initial construction. In particular, the weight of the new filter is not taken into account.

2.6.2 Delete

FIG. 7 shows pseudocode 58 for the incremental delete procedure. Its general form is similar to the insert procedure, the filter to be deleted is recursively "diffused" down the tree until it is either "absorbed" by a node or remove from a leaf filter bucket.

The main difference being that a delete may cause previously covered filters to "reappear." This set of newly uncovered filters needs to be carried downward (in the variable U) in the tree in a way similar to insert. These uncovered filters are eventually either "absorbed" by a node or added to a leaf bucket filter. Thus, after a delete, it is possible that the search tree may have more nodes than before The complexity of a delete is bounded by the depth of the tree and the number of filters that is (collectively) covered by the filter to be deleted. Since a covering potentially represents a policy configuration problem, the number of coverings should be minimal. In other words, the average performance of delete is determined mostly by the depth of the tree.

3. Implementation Considerations

In a typical implementation, initial construction and update are software procedures that run on a standard CPU. They build and maintain the search data structure in memory which, after appropriate downloading of the structure into the memory of the search engine, is in turn accessed by the search procedure. The search itself can be implemented either as customized hardware (e.g., FPGAs or ASICs) or as part of the data path software, depending on the particular design approach.

Mutual exclusion can be important during update of the search data structure. This can be achieved by double buffering and some form of atomic switch.

3.1 Initial Construction

If weights are not available, the initial construction may be run with all weights set to unity. Then every so often the construction can be re-run using actual usage statistics. The re-run can also be triggered by some measure of "balancedness," the number of updates, etc.

Because the tree is only used to narrow the set of filters to a small set, which is then examined using another search procedure, the dimensions examined in the tree construction phase need only be a subset of all the dimensions to be searched. In particular, the examination of the dimensions where range filters are common can be deferred until the filter bucket phase.

The two time consuming steps in the initial construction are the reduction and the preference computation. The former can be performed in O (N log N) time where N is the number of filters to be reduced. The computation can be reused from the parent to the children.

Technically, the reduction step can be skipped at the expense of a potential blowup in storage requirements. It may be acceptable for small filter table sizes (e.g., 4K) with an appropriate bucket size (e.g., $\geq 8$).

Preference computation can be sped up by bounding the number of columns to be examined. This is straightforward for non-weighted case, as $N^*_j( )$ is an increasing function of the column number j within a single dimension.

Fortunately, even thought he number of nodes expands at each layer, the tree construction gets more efficient, as both the number of filters and the number of columns decrease at each layer. The former could decrease geometrically while the latter linearly.

3.2 Search

There are three keys to optimizing search performance: (1) reduce the complexity of the basic search step; (2) reduce the number of memory accesses; and (3) consider pipeline implementation. We describe each below.

(A) Basic Search Step. Our approach has 3 kinds of basic search steps, namely, indexing to select the correct subtree to search, tree traversal based on a particular bit position, and the matching of a packet to a single filter. The first two are extremely primitive and map directly to hardware instructions even with a software implementation. The third requires a number of comparisons proportional to the number of dimensions. In hardware through, parallel comparators can be used to perform the match in a single step.

(B) Memory Organization. Careful memory organization can be important to improving search performance. To reduce data access time:

Data that is needed in the immediate future should be stored close together (e.g., in the same memory page) so that they are available without further fetching. For example, a child node should be stored close to its parent, as that is available as soon as the branching decision is made. We have developed what we believe to be a novel scheme for compressing and storing tree nodes such that the nodes lying on a frequently visited tree path are stored closely together in a memory page. We describe our scheme below under Tree Compression in Section 3.3.

Multiple separated memory banks should be used for pipelining (see below).

(C) Pipelining. By dividing the search steps into different stages, and pipelining through the stages, throughput (or the number of classification per second) can be significantly improved (though latency may increase slightly because of the transitions between stages).

Figure 8:
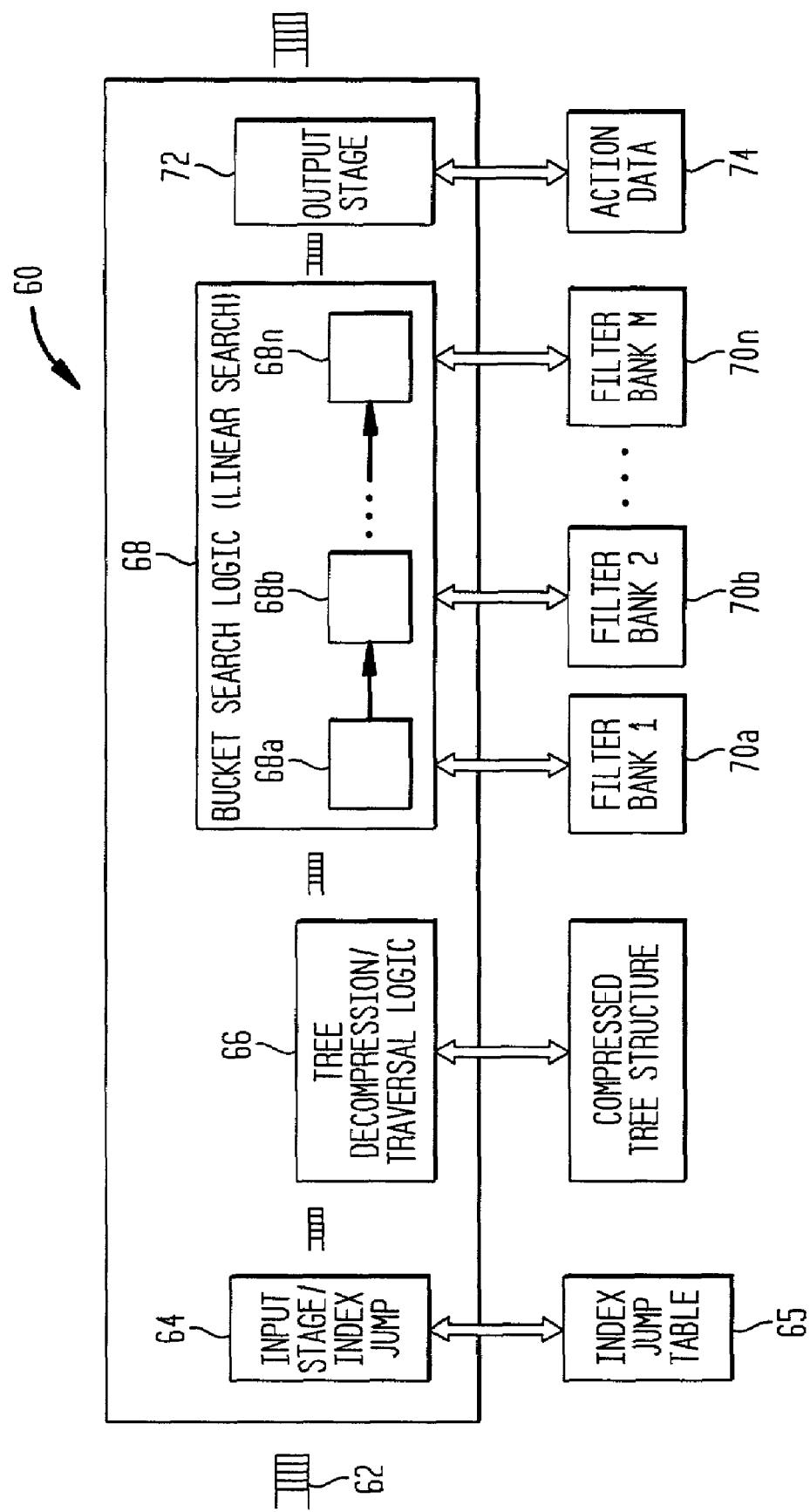
FIG. 8 shows a hardware apparatus for classifying packets according to a second embodiment of the invention.

An example hardware pipelined implementation 60 is shown in FIG. 8. There are 4 stages in the pipeline:

Input/index jump 64, which retrieves a packet header from an input FIFO 62, and look up the starting address of an appropriate search tree from an index jump table 65.

Tree traversal 66, which reads in tree nodes by pages and makes branching decision.

Bucket search 68, which has its own internal pipeline. Each stage 68a, 68b, . . . , 68n of this M-stage internal pipeline handles BUCKETDEPTH/M filters. For each stage to operate in parallel, each has its own memory bank 70a, 70b, . . . , 70n for storing the selected section of the filters.

Output stage 72, which retrieves action data 74 corresponding to the match.

3.3 Storage

The bucket size provides an effective control for the amount of storage used. A bucket size of one means the search tree must distinguish every single filters from one another, thus a large tree is needed. A bucket size equal to the size of the filter table requires the minimal storage, and is equivalent to a linear search.

The algorithm presented here does not provide a nontrivial worst-case storage bound as it depends on the distribution of the "0", "1", and "*" in the given filter table. It is possible to construct a highly skewed, but unrealistic, filter table that will require a large number of nodes.

3.3.1 Tree Compression.

Figure 9A:
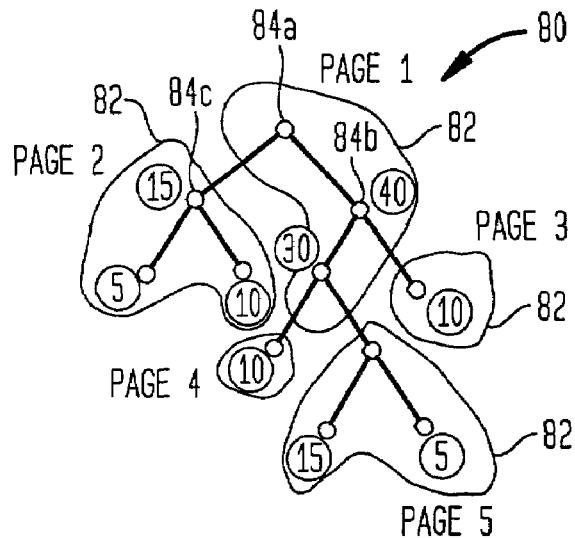
FIG. 9A is a schematic digram exemplifying how a search tree may be mapped onto memory pages according to the second embodiment.

The search tree can be stored in a highly compressed form with a pointerless representation. See, for example, reference document no. 12. The compression follows two steps:

(1) Referring to an example in FIG. 9A, a search tree 80 is first segmented into subtrees 82 having a maximum size or number of nodes X, where X is chosen based on the size of a memory page. FIG. 9A shows a simple example where X=3. A Huffman-encoding-like procedure can be used for the segmentation (see, for example, reference document no. 1). In the illustarted embodiment each node 84 is labeled or associated with a weight (shown as encircled numerals in FIG. 9A). The weight of a leaf node is preferably the sum of the weights of all filters in its bucket. The weight of an internal node is preferably the sum of the weights of its children. Starting from the root node, nodes are collected into a memory page by selecting the node with the largest weight from all the nodes adjacent to some nodes already in the page. (This is somewhat similar to the well-known Dijkstra algorithm for computing shortest path.) For example, in FIG. 9A, where X=3, node 84b is selected for inclusion in memory page 1 along with the root node because node 84b is weighted higher than node 84c. This process continues until the memory page is full. Then a new page collection is started with one of the adjacent nodes.

Figure 9B:
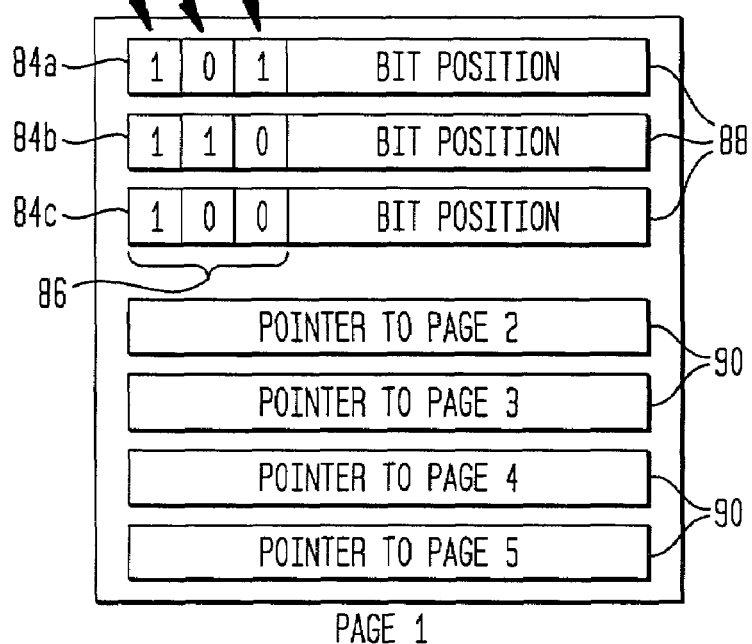
FIG. 9B is a schematic diagram exemplifying a memory page in accordance with the second embodiment which stores a portion of a saerch tree in a compressed format.

(2) Referring to FIG. 9B which shows an example encoding of memory page 1 derived from FIG. 9A, each internal tree node 84 is preferably encoded using a 3-bit type 86 together with log W bits (W is total number of its in all dimensions) of node information 88, i.e., the bit position to be examined. As such, for source and destination IP address filters each internal node can be stored in 9 bits. Each leaf node needs a 1-bit type together with a bucket ID (not shown in FIG. 9B). The memory page also includes external pointers 90. Note that for a page with X nodes, there are the most X+1 external pointers.

Using the foregoing tree compression, a search tree with even up to 1 million nodes (which is not typical considering the results in Section 5) takes up around 4M byte memory in the worst case, which is relatively insignificant in a modem high-end router having 1 G byte of memory.

3.3.2 Filter Bucket Compression.

Filters common to many filter buckets need not be stored multiple times. For example, a filter cache for the M most frequently occurring filters can be kept in on-chip memory. The cached filters can be represented by a cache index in the filter buckets they appear.

3.3.3 Wildcard Separation.

Wildcard filters are the main contributors toward storage explosion. If a dimension includes a large majority of wildcard filters, it may be better off to separate them out in another table and construct two different search trees that must both be searched to find a match.

As a concrete example, consider a filter table with source and destination IP addresses as the two dimensions. Instead of constructing a single search structure for all the filters, one can partition table up into four subtables: Table 1: all filters in which both are the source and destination addresses are not wildcards; Table 2: all filters in which the source address is a wildcard; Table 3: all filters in which the destination address is a wildcard; Table 4: all filters in which both the source and destination addresses are wildcards, which contains at most 1 filter. Corresponding to these 4 subtables, 4 search trees can be built and searched to find a match.

3.4 Update

The performance of updates is dependent on two things: (1) the speed of the reduction check at each node; and (2) the number of times an update is multiplied in traversing internal nodes. An update is not propagated further if it found to be covered via reduction.

To speed up insert, it is possible to skip the reduction checks at internal nodes and apply them only at filter buckets. For deletes, deletion of filters inserted after the initial construction can proceed without reduction check. Deletion of original filters, however, must still follow the standard procedure. In this way, insert and delete of transient filters (e.g., per-connection filters in firewall) and/or exact filters can be handled quickly. Obviously, the lack of a reduction check implies the potential forwarding of unnecessary updates, and extra storage.

To avoid repeated splitting and collapsing of filter buckets due to insertion and deletion of transient filters, each filter bucket may have an overflow area to handle a temporary overflow situation.

4. Modeling Filter Tables

To evaluate our algorithms, we need to apply it to realistic filter tables. However, none of the existing filter tables we have found satisfies our purposes. First, most have only a few tens to a maximum of hundreds of filters. The small number of filters is a direct result of the fact of that the performance of existing filtering algorithms degrade severely when large number of filters are used. Second, most existing filter table are for firewall application. Firewall filters rules do not represent what future application-specific filter rules (e.g., QoS or load balancing) may look like once packet classification becomes commonplace.

With the lack of actual data, we resorted to modeling. To properly model a filter table, identified (1) the basic characteristics of an IP filter table, and (2) the "location" where the filtering is to be performed.

Regarding the basic characteristics of IP filter tables, we make a few observations:

(A) Characteristics of Individual Dimensions. We focused most of our experimentation on IP filter tables with two (source and destination IP addresses) or five (source and destination IP addresses, protocol number, and source and destination port numbers) dimensions.

> The characteristics of a typical filter on these dimensions are as follows: (a) Source and destination address filters are strongly dependent of the location of filtering. For example, the egress source address filters on a enterprise edge router would specify a prefix based on the address domain of the enterprise (see below). (b) Protocol number filters are highly skewed, with most entries being one of the popular protocols TCP, UDP, ICMP, IGMP or a complete wildcard. Among these, TCP dominates most others. (c) Port number filters are mostly to well-known ports in one direction (destination port for the egress direction on a client side, source port for the ingress direction on the server side) and a random port in the other. The filter "$\leqq 1024$," which is expressible as a mask filter, is highly popular among non-specific ports. Filtering rules could be quite symmetric in the ingress and egress directions. Since most filtering devices (e.g., routers) have a sense of direction, the ingress and egress filtering rules can be placed in two tables.

(B) IP Address Filters. As far as the source and destination IP address filters are concerned, we can classify filtering rules into 2 major types: (a) fixed to fixed, and (b) fixed to any: In "fixed to fixed" both source and destination IP addresses have some specific prefixes. This corresponds to per-connection, Intranet, or VPN filters. In "fixed to any" one of the address filters has a specific prefix while the other is a wildcard. This corresponds to a generic Internet filter.

> Separately, address filters may be classful or classless. A classful filter's prefix ends at the class boundaries (e.g., 8, 1, 24) while a classless filter's prefix can end in any bit position (still typically $\geqq 8$) [8].

(C) Filter Specificity. Large filter table can not be hand-coded. Instead, the filtering rules are typically generated via automatic scripts at network provisioning/installation time or at run time (e.g., flow detection).

> As a result, the filter tables are typically structured in a way consistent with the organization or management hierarchies. Specifically, more specific rules tend to precede less specific ones. An example of the order is host-specific rules, then subnet specific rules, then domain rules, then policy meta rules, and finally default (or catchall) rules. In other words, the number of don't care increases as we go down the table.

Regarding the "location" where filtering is to be performed, since the main interest is in router design, the general structure of the filter tables in different classes of routers we have been looked at. Observations are tabulated in table 92 of FIG. 10. Included also are the cases for workstations or servers for cases of host-based filtering. All the address characteristics refer to the egress direction, with the exception of the server host case. The other direction is typically symmetric.

An explaination is presented using the ISP edge router case as an example. Packet classification at an ISP edge router is used for the following purposes: (1) QoS (traffic policing/marking/class assignment/buffer management/drop policy). QoS filters are typically specified by source IP address prefix, application (destination port number), and TOS. (2) Address space consistency. Address space filters are to ensure provider-based addressing, and are specified with source IP address prefix. (3) Tunnel or VPN origination. Tunnel or VPN filters are typically specified using source and destination IP prefixes.

Since an ISP edge router serves a large number of customers, each terminating at a different logical port, and each with a different domain prefixes. The filters can be naturally segmented by customers' logical port ID or domain prefixes. On the whole, the source address filters is drawn from a large set of domain prefixes and the destination address filters is drawn from another set of domain prefixes (for VPN) or a wildcard (Internet).

For experimentation, a specification language was developed for specifying how filters should be generated. In particular, a distinct specification was created for modeling each of the router classes in FIG. 10. A filter generation utility read in the specification and generated a filter table with the required number of filters.

5. Experimental Results

The experiments used the following methodology: For each of the router classes in FIG. 10, a number of basic filter specifications was defined. Using these filter specifications, a large number of filter tables was generated for different filter table sizes using different parameters. Tree statistics were gathered by generating the search data structure for each of these filter tables. Search time statistics were gathered by first generating packet test files from the filter and run those against the search data structures.

Most experiments focused on two cases: (1) five dimensional filter tables including source and destination IP addresses, protocol number, and source and destination port numbers; and (2) two dimensional filter tables with only source and destination IP addresses. The trends in both cases are similar, with the case for two dimensions being worse in terms of absolute numbers as there are fewer available bit positions for differentiation. The results for the two dimensional case are presented below.

All results are obtained from pure application-level software implementations of the algorithms in C on a standard desktop Pentium II 400 MHz with 512K L2 cache.

The results are summarized in FIGS. 11–13. FIG. 11 shows the general trend as filter table size increases. FIG. 12 shows the effect of filter bucket size on the storage and search performance. FIG. 13 shows the benefits of the first level index jump table. The notations A×B refers to the use of A and B bits respectively from the two dimensions to form the jump table. The results are elaborated on below.

It should be noted that the results presented here represent average case performance using our filter table models. It is possible for one to construct artificial examples whose results deviate significantly from the average case. In addition, as our result show, the filter bucket size and the index jump table can serve as effective tunable controls to temper potential "bad" filter tables.

5.1 Tree Statistics

From FIG. 11($a$), note that the number of filter buckets grows linearly with the filter table size, while the depth grows generally logarithmically with the filter table size. Even for 1 million filters, less than 200,000 filter buckets are used, with total storage need of at most 14 M bytes. (Total storage is computed as storage for internal nodes plus storage for leaf nodes plus storage for filter buckets, which is equal to 200,000*41 bits+200,000*25 bits+200,000*64 bytes, or 14 M bytes, assuming the worst case that every filter bucket is full.)

Note also that the weighted case have a larger tree in general. The percentage increase gets increasingly insignificant for larger filter tables. For 1 million filters, the percentage increase is about 2%.

Figure 12A:
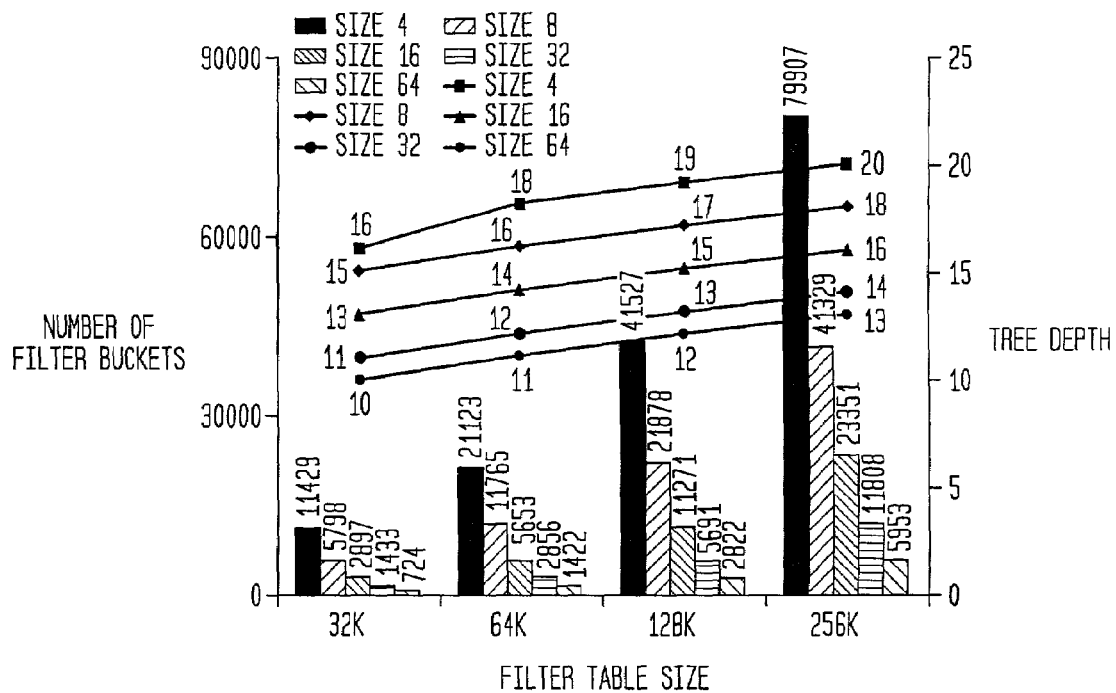
FIGS. 12(a) and 12(b) are graphs illustrating the number of filter buckets and the search rate as a function of the size of a filter table in various instantiations of the first embodiment in which no jump table is employed.

From FIG. 12(a), note that the filter bucket size provides an effective control for storage requirements. A doubling of the filter bucket size about halves the number of filter buckets.

Figure 13A:
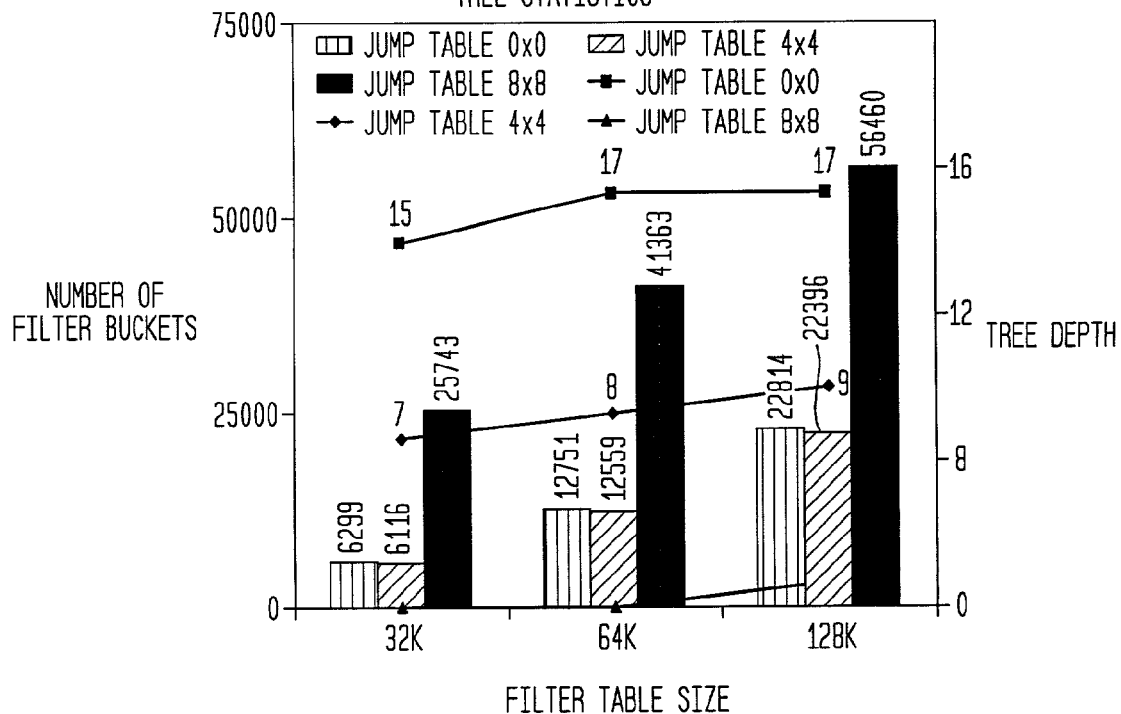
FIGS. 13(a) and 13(b) are graphs illustrating the number of filter buckets and the search rate as a function of the size of a filter table in a particular instantiation of the first embodiment having various sizes of jump tables.

From FIG. 13(a), note that the use of jump table decreases tree depth proportionally, though it does increase the number of filter buckets. This apparent contradiction is explained by the fact that a large number of the jump table entries point only to a single-node subtree which is counted as a single filter bucket. A 8×8 jump table contains potentially $2^{(8+8)}$=65536 entries.

5.2 Search Performance

From FIG. 11(b), note that the search performance decreases logarithmically with increase in filter table size. The performance range is from about 370,000 classifications for filter table size of 4K to 170,000 classifications for filter table size of 1 M. Since these results are from an application-layer program, we expect many-fold increase in performance in an embedded software implementation running on a dedicated CPU, and even better improvement with a customized hardware implementation. For example, a hardware pipeline implementation using parallel comparators can remove the key bottlenecks such as bit examination and the linear filter bucket search.

Note also that the weighted case generally performs better than the non-weighted case. In fact, the percentage speedup improves as the filter table size increases. At 1 million filters, the percentage improvement is almost 21%.

Figure 12B:
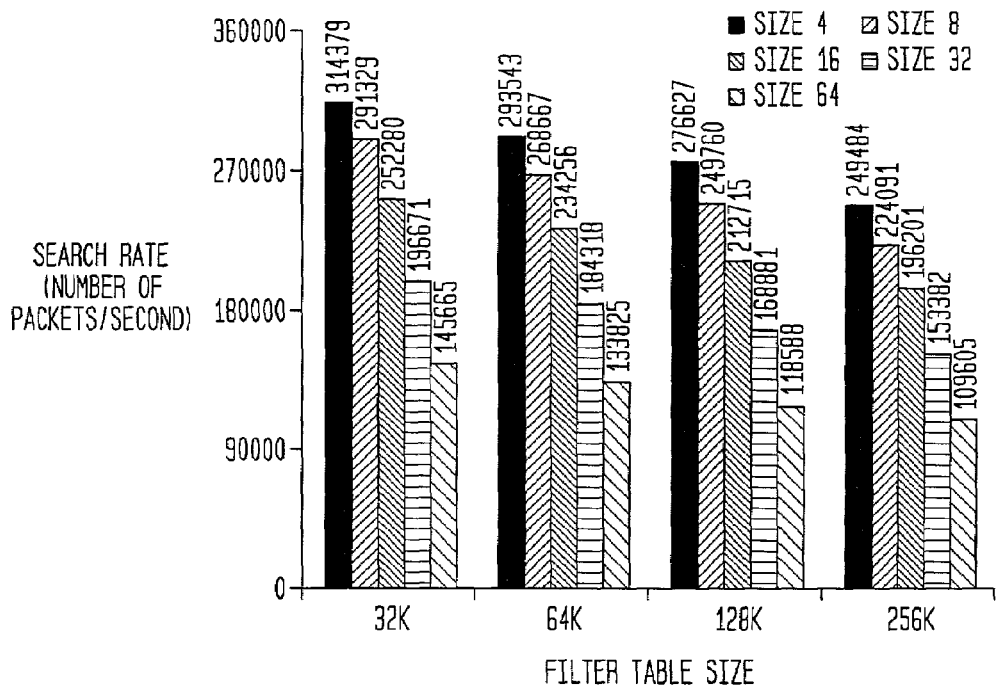

From FIG. 12(b), note that as the filter bucket sizes increases, the search rate decreases, as expected. The decrease is, fortunately, sub-linear. A double of filter bucket size does not come close to halving the search rate.

Figure 13B:
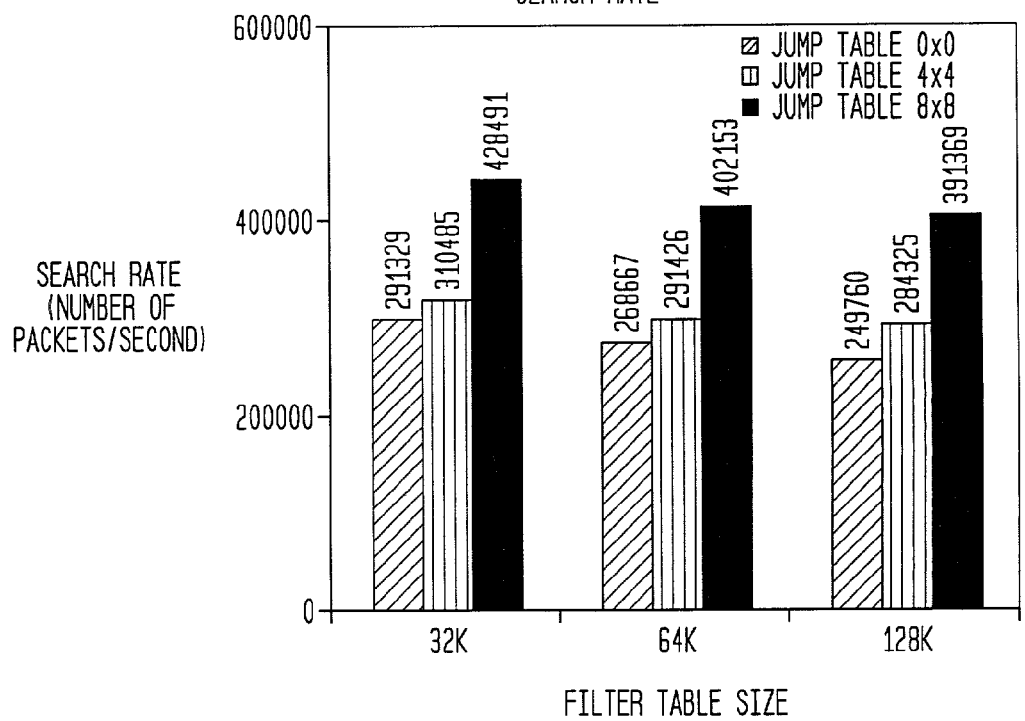

From FIG. 13(b), note the benefits of using a jump table. The search rate is higher with the use of jump table. In particular, the use of an 8×8 jump table provides a speedup of more than 40%.

6. Comparison

Existing approaches to packet classification can be grouped into two broad categories: geometry-based and non-geometry-based. The former refers to algorithms that interpret filters as geometric shapes, and map the packet classification problem to some form of geometric point-location problem. The latter refers to any other approach based on regular data structures such as trees and graphs. The technique presented in reference document no. 10 belongs to the former, while the techniques presented in reference document nos. 5 and 9 and our techniques belong to the latter.

Reference document no. 10 presents 2 algorithms. The first algorithm admits a hardware implementation but does not readily scale to a large number of filters. The second algorithm applies only to 2 dimensions, and it does not appear to easily generalize to higher dimensions.

Reference document no. 9 also presents 2 algorithms, namely, Grid of Tries and Crossproducting. The construction of the former appears to be complicated, and updates can not be easily performed. A cascade update of switching pointers may be triggered by a single update.

Reference document no. 5 uses an approach based on a directed acyclic graph (DAG). The approach is simple, but it requires $O(N^2)$ storage. Since no formal description was given for the algorithm, it is not clear how the algorithm scales to large number of filters.

Most existing studies focus more on the worst-case bounds. The emphasis here has been on practical approach with good average case performance and tunable controls to deal with "bad" cases.

Asymptotic performance measure is sometimes inadequate. For organizational and management reasons, filter tables with a large numbers of filters can become too unwieldy to be used. The average case performance under realistic scales can be drastically different from that of the worst case. In addition, in particular situations, there can be better ways to deal with large number of filters, e.g., segmentation, than to use a generic packet classification approach.

From the foregoing it will be seen that the invention combines two search procedures: a heuristic tree search for separating a large set of filters into maximum size filter buckets, and another search procedure for searching through filter buckets of fixed size. The embodiments presented above yielded good search speed, e.g., over 250K classifications per second for a 128K filter table using a pure software implementation, and reasonable storage, e.g., 1.4 M bytes for a 128K filter table. The embodiment illustrated above can also adapt to the input traffic distribution, i.e., relative filter usage, and use it to effectively decrease the search time.

Alternative embodiments of the invention can employ different bit or multibit selection criteria. The embodiments described herein can also be easily adapted to return all matching filters, which can be useful for many applications such as multi-resolution network measurements. Similarly, those skilled in this art will appreciate that numerous other modifications and variations may be made to the embodiments described herein without deprating from the spirit or scope of the invention.

I claim:

1. A data structure for organizing a plurality of k-dimensional filters used to direct k-dimensional bit strings, k>0, comprising:
    a jump table indexed on pre-selected bit positions of pre-selected filter dimensions, said jump table pointing to a plurality of search trees;
    each of said search trees having one or more terminating leaf nodes prior to the last node of said tree which direct the bit string to a relatively small set of filters.

2. The data structure according to claim 1, wherein said jump table is indexed on a pre-selected prefix length, $h_j$, for each filter dimension j, $1 \leq j \leq k$.

3. The data structure according to claim 2, wherein said trees are constructed such that each node thereof is associated with pre-selected bit positions of at least one pre-selected filter dimension.

4. The data structure according to claim 2, wherein said search trees are $2^m$-ary trees, m>0, and constructed such that each node is associated with m consecutive bits at pre-selected bit positions of a pre-selected filter dimension.

5. The data structure according to claim 4, wherein m=1 and the search trees are constructed such that successively deeper nodes in the tree structure are associated with successive bit positions of pre-selected filter dimensions.

6. The data structure according to claim 5, wherein each non-leaf node has two child nodes, one said child node representing a set of filters having a 0 or * bit at the bit position corresponding to the non-leaf node, and the other said child node representing a set of filters having a 1 or * bit at the bit position corresponding to the non-leaf node.

7. The data structure according to claim 6, wherein the filter dimension associated with each node is selected so as to substantially minimize the depth of the corresponding tree.

8. The data structure according to claim 6, wherein the filter dimension associated with each node is selected so as to substantially maximize the balancedness of the corresponding tree.

9. A method of identifying a filter used to classify a packet having at least one corresponding field of interest, comprising:
  (a) searching a jump table for an entry matching the bits at pre-selected bit positions of said at least one packet field, wherein said jump table points to a plurality of search trees, said search thereby identifying one of said search trees;
  (b) traversing said identified search tree until a terminating leaf node is reached, wherein said termination leaf node is prior to the last node of the tree said terminating leaf node directing the packet to at least one filter bucket; and
  (c) searching said identified filter bucket until a match is found between the bits of the at least one packet field and the bits of the filter.

10. A method of identifying a k-dimensional filter used to classify a packet having k corresponding fields of interest, k>0, comprising:
  (a) searching a jump table for an entry matching the bits at pre-selected leading bit positions of one or more pre-selected fields of said packet, wherein said jump table is indexed on pre-selected prefix lengths of pre-selected filter dimensions and points to a plurality of search trees, said search thereby identifying one of said search trees;
  (b) traversing said identified search tree by comparing the bits at pre-selected bit positions of one or more pre-selected fields of said packet against the bits at pre-selected bit positions of pre-selected filter dimensions associated with each node of said tree until a terminating leaf node is reached wherein said termination leaf node is prior to the last node of the tree, said terminating leaf node directing the packet to at least one filter bucket; and
  (c) searching said identified filter bucket until a match is found between the bits of the k packet fields and the bits of the k filter dimensions, if any.

11. The method according to claim 10, wherein:
  said jump table is indexed on a pre-selected prefix length, $h_j$, of each filter dimension j, $1 \leq j \leq k$; and
  said jump table search includes concatenating the leading $h_j$ bits of each field of said packet and comparing said concatenation against entries in said jump table.

12. The method according to claim 11, wherein said search trees and are constructed such that each node thereof is associated with pre-selected bit positions of at least one pre-selected filter dimension.

13. The method according to claim 11, wherein said search trees are $2^m$-ary trees, m>0, and constructed such that each node is associated with m consecutive bits at pre-selected bit positions of one pre-selected filter dimension.

14. The method according to claim 13, wherein m=1 and the search trees are constructed such that successively deeper nodes in the tree structure are associated with successive bit positions of pre-selected filter dimensions.

15. The method according to claim 14, wherein each non-leaf node has two child nodes, one said child node representing a set of filters having a 0 or * bit at the bit position corresponding to the non-leaf node, and the other said child node representing a set of filters having a 1 or * bit at the bit position corresponding to the non-leaf node.

16. The method according to claim 15, wherein the filter dimension associated with each node is selected so as to substantially minimize the depth of the corresponding tree.

17. The method according to claim 15, wherein the filter dimension associated with each node is selected so as to substantially maximize the balancedness of the corresponding tree.

18. A method of converting a k-dimensional filter table, comprising:
  segmenting said filters into broad subsets based on pre-selected prefix lengths of pre-selected filter dimensions; and
  recursively dividing each said broad subset into one or more filter buckets wherein each broad subset is prior to a last subset;
  wherein said broad subsets are represented by a jump table indexed on pre-selected prefix lengths of pre-selected filter dimensions, said jump table pointing to said broad filter subsets.

19. The method according to claim 18, wherein said jump table is indexed on a pre-selected prefix length, $h_j$, for each filter dimension j, $1 \leq j \leq k$.

20. A method of converting a k-dimensional filter table, comprising:
  segmenting said filters into broad subsets based on pre-selected prefix lengths of pre-selected filter dimensions wherein each of said broad subsets is prior to the last subset; and
  recursively dividing each said broad subset into one or more filter buckets;
  wherein each said broad filter subset is organized as a $2^m$-ary tree, m>0, said filter buckets being logically disposed at leaf nodes thereof.

21. The method according to claim 20, wherein said tree is constructed such that each node is associated with m bits at pre-selected bit positions of a pre-selected filter dimension.

22. The method according to claim 21, wherein m=1 and said tree is constructed such that successively deeper nodes thereof are associated with successive bit positions of pre-selected filter dimensions.

23. The method according to claim 22, wherein each non-leaf node has two child nodes, one said child node representing a set of filters having a 0 or * bit at the bit position corresponding to the non-leaf node, and the other said child node representing a set of filters having a 1 or * bit at the bit position corresponding to the non-leaf node.

24. The method according to claim 23, wherein the pre-selected filter dimension is the one which minimizes $N*_j$, where j is a bit position.

25. The method according to claim 23, wherein the pre-selected filter dimension is the one which minimizes $D_j$, where j is a bit position.

* * * * *